United States Patent [19]
Mizuuchi et al.

[11] Patent Number: 5,142,596
[45] Date of Patent: Aug. 25, 1992

[54] TAPERED LIGHT WAVE GUIDE AND WAVELENGTH CONVERTING ELEMENT USING THE SAME

[75] Inventors: Kiminori Mizuuchi, Hirakata; Kazuhisa Yamamoto, Settsu; Tetsuo Taniuchi, Kobe, all of Japan

[73] Assignee: Matsushita Electric Industrial Co., Ltd., Osaka, Japan

[21] Appl. No.: 730,442

[22] Filed: Jul. 16, 1991

[30] Foreign Application Priority Data

Jul. 24, 1990 [JP] Japan .................................. 2-196631

[51] Int. Cl.⁵ ........................ G02B 6/26; G02B 6/10; H03F 7/00
[52] U.S. Cl. ........................................ 385/43; 385/130; 385/132; 385/122; 359/326; 359/332
[58] Field of Search ............. 350/96.11, 96.12, 96.13, 350/96.14, 96.15, 96.17; 307/425, 426, 427, 428, 429, 430; 385/43, 122, 129, 130, 132, 14; 359/326, 328, 330, 332

[56] References Cited

U.S. PATENT DOCUMENTS

| | | | |
|---|---|---|---|
| 3,610,727 | 10/1971 | Ulrich | 385/130 X |
| 4,278,322 | 7/1981 | Mahlein | 385/33 |
| 4,415,227 | 11/1983 | Unger | 385/43 |
| 4,761,048 | 8/1988 | Gregoris et al. | 385/130 X |
| 4,773,720 | 9/1988 | Hammer | 385/43 |
| 4,787,689 | 11/1988 | Korotky et al. | 385/43 |
| 4,886,538 | 12/1989 | Mahapatra | 385/43 X |
| 4,938,841 | 7/1990 | Shahar et al. | 156/661.1 |
| 4,951,293 | 8/1990 | Yamamoto et al. | 359/332 |
| 4,973,125 | 11/1990 | Normandin | 385/122 X |
| 5,033,812 | 7/1991 | Yoshida et al. | 385/37 |
| 5,078,516 | 1/1992 | Kapon et al. | 385/43 |
| 5,080,507 | 1/1992 | Harada et al. | 385/122 |

FOREIGN PATENT DOCUMENTS

2-236505 9/1990 Japan .................................. 385/43 X

*Primary Examiner*—Brian Healy
*Attorney, Agent, or Firm*—Stevens, Davis, Miller & Mosher

[57] ABSTRACT

A tapered light wave guide reduced in propagation loss, improved in coupling efficiency and free from the problem of optical damage. An input section, a widthwise tapered coupling section having a depth d2, and a wave guide having a depth d1 are formed on an $LiNbO_3$ substrate. A depthwise tapered section in which the depth is changed from d2 to d1 is provided to connect the widthwise tapered coupling section having constant depth d2 and the wave guide, whereby a reduction in light propagation efficiency due to optical damage is prevented.

7 Claims, 9 Drawing Sheets

$P_1 / (W_2 \times d_2) \leq 300 \, kw/cm^2$

TAPERED LIGHT WAVE GUIDE AND WAVELENGTH CONVERTING ELEMENT USING THE SAME

BACKGROUND OF THE INVENTION

This invention relates to a light wave guide which has a tapered coupling section and which enables highly efficient coupling between a light wave guide and a laser or a fiber used in the field of optical information processing and in the field of applied optical measurement control applied with a coherent light source, and to a wavelength converting element using this wave guide.

TE/TM mode splitters and wavelength converting elements have conventionally been manufactured by forming a light wave guide on LiNbO$_3$ based on a proton exchange method. In wave guides thereby manufactured, the difference between the refractive indices of the wave guide and the base is large ($\Delta$ne>0.1), and the thickness is very small, 0.4 to 0.6 $\mu$m if the wave guide is arranged to propagate light in a single mode. To improve the efficiency of coupling with the wave guide, therefore, tapering a section through which light is introduced into the wave guide has been proposed.

A conventional light wave guide is known in which a section through which incident light is introduced into a wave guide section is widen by tapering or the like (This type of light wave guide is hereinafter referred to simply as "tapered wave guide"). FIG. 10 shows the basic construction of this conventional tapered wave guide. This wave guide includes a ferroelectric material substrate 21, a wave guide 22, a tapered wave guide 23, and an input section 24.

In the conventional tapered wave guide having this construction, the shape and the area of the section through which light is introduced are changed so that the distribution of the wave front of exciting coherent light in the wave guide matches with the electric field of the guided mode of propagation through the wave guide, thereby obtaining a high efficiency of coupling with the wave guide with respect to coherent light.

A method of manufacturing such a tapered wave guide is disclosed by J. C. Campbell on pages 900 to 902 of Applied Optics, March 1979, volume 18. In this method, as shown in FIG. 11, a tapered incident light wave guide is formed by gradually immersing substrate 21 in a solution 25 of AgNO$_3$ so that the diffusion depth is changed. In the case of forming a wave guide on LiNbO$_3$ substrate 21, benzoic acid is used as solution 25 and heating is effected at about 200° C. to form a tapered wave guide. In FIG. 11, a heater and a beaker are indicated by 26 and 27, respectively.

In the above-described arrangement, however, it is difficult to sufficiently widen the input section 24 of the tapered incident light wave guide relative to the non-tapered wave guide. While the wave guide is widened in directions of width and depth, the section through which light propagates is abruptly reduced at a position where the wave guide is narrowed by tapering. Therefore the power density in the wave guide is abruptly increased at this position so that optical damage is caused, if the light is converged at this position. In the tapered section, both the width and the depth are increased so that a multi-mode wave guide is formed, but coupling occurs between guided multiple modes by a change in refractive index caused by optical damage, resulting in occurrence of a coupling loss at the position where the single-mode wave guide and the tapered section are connected.

The above-described method of manufacturing a tapered wave guide entails a problem in that the temperature of a portion not immersed in the solution is lowered by vapor during the high-temperature heat treatment, and in that the section through which light is introduced cannot be formed in accordance with the design with desired reproducibility.

SUMMARY OF THE INVENTION

It is an object of the present invention to provide a tapered light wave guide having reduced in propagation losses, having a high coupling efficiency and free from the problem of optical damage.

It is another object of the present invention to provide a wavelength converting element formed by using this wave guide and having high conversion efficiency.

To achieve these objects, according to one aspect of the present invention, there is provided a tapered light wave guide comprising a wave guide formed on a substrate and having a depth d1; a coupling section formed at an end of the wave guide, tapered in the direction of width of the substrate and having a depth d2 (d2>d1); and a depth tapered section formed between the wave guide and the coupling section, the depth of the depthwise tapered section being changed from d2 to d1 by tapering.

According to another aspect of the invention, there is provided a wavelength converting element comprising an ion-exchanged wave guide formed on a nonlinear optical crystal substrate; and having a depth d1; a coupling section formed at an end of the ionexchanged wave guide, tapered in the direction of width of the substrate and having a depth d2 (d2>d1); and a depthwise tapered section formed between the wave guide and the coupling section, the depth of the depthwise tapered section being changed from d2 to d1 by tapering.

Preferably, if the width of the coupling section is W2, the relationship between the depth d and the width W2 of the coupling section with respect to the guided light power P is $P/(d2 \times W2) \leq 300$ kW/cm$^2$.

In the arrangement of the present invention, a depthwise tapered section in which the depth is changed from d2 to d1 is provided between the wave guide formed on the substrate and having the depth d1 and the coupling section formed at the end of the wave guide, tapered in the direction of width of the substrate and having the depth d2 (d2>d1). To avoid occurrence of optical damage at the coupling section, the wave guide depth is increased in the widthwise tapered section of the light wave guide so as to reduce the power density therein, and the light wave guide is tapered so that the depth is reduced from the position where the widthwise tapered section ends and where the propagation mode is shifted to a single mode. It is thereby possible to construct a tapered wave guide having reduced propagation losses, improved in coupling efficiency and free from the problem of optical damage. A wavelength converting element having improved conversion efficiency can be manufactured with this light wave guide having improved coupling efficiency.

These and other objects and advantages of the present invention will be apparent from the following detailed description, taken in conjunction with the accompanying drawings of preferred embodiments.

DESCRIPTION OF THE PREFERRED EMBODIMENTS

Embodiment 1

Figure 1:
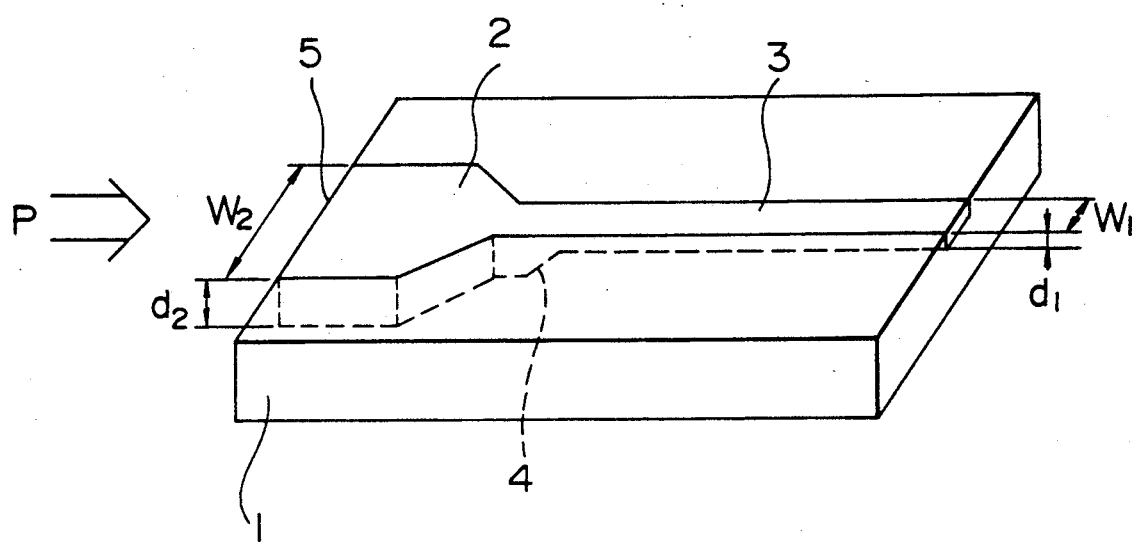
FIG. 1 is a schematic perspective view illustrating a tapered wave guide in accordance with a first embodiment of the present invention.

FIG. 1 shows the construction of a tapered wave guide in accordance with a first embodiment of the present invention. A substrate 1 is formed of LiNbO$_3$ to provide a +Z plate (the + side of the substrate cut perpendicularly to the Z axis) having a refractive index of 2.1. On the substrate 1 are provided a widthwise tapered section 2 formed by proton exchange in pyrophosphoric acid, having a refractive index of 2.3 and a depth of 1.5 μm and tapered widthwise, a wave guide 3 formed by proton exchange in pyrophosphoric acid and having a depth of 0.4 μm, a depthwise tapered section 4 formed by proton exchange in pyrophosphoric acid and tapered so that its depth is changed from 1.5 to 0.4 μm, and an input section 5 formed at an end surface by optical polishing.

A constructional feature of this embodiment, in which the input section 5 having a depth d2, the widthwise tapered section 2 having a depth d2 and the wave guide 3 having a depth d1 are arranged on the LiNbO$_3$ substrate 1, resides in that the depthwise tapered section 4 in which the depth is changed from d2 to d1 is provided to connect the widthwise tapered coupling section 2 having the constant depth d2 and the wave guide 3 having the depth d1.

The importance of setting the depth of the widthwise tapered coupling section to a constant depth of d2 and providing depth tapered section 4 in the wave guide 3 will be explained below with reference to the drawings.

Figure 2A:
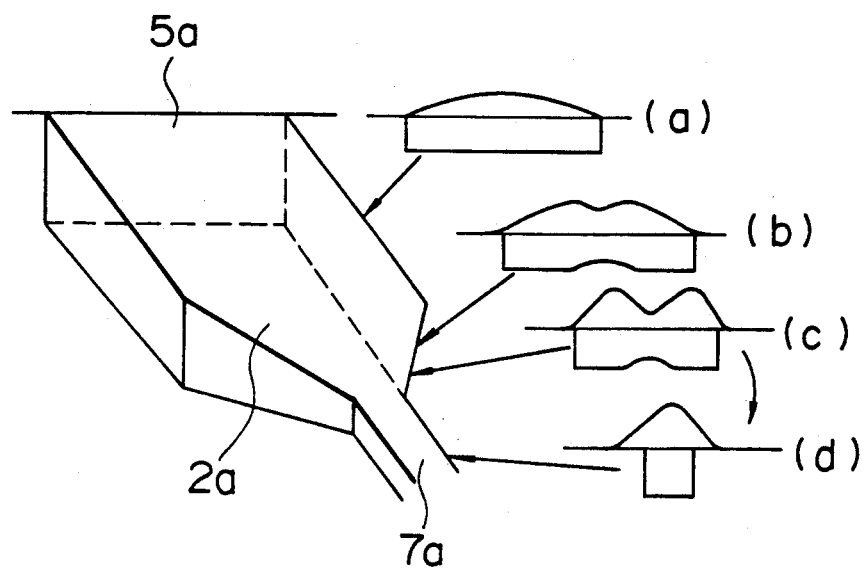
FIG. 2A is a diagram showing guided modes and changes in refractive index of the conventional tapered wave guide.
Figure 2B:
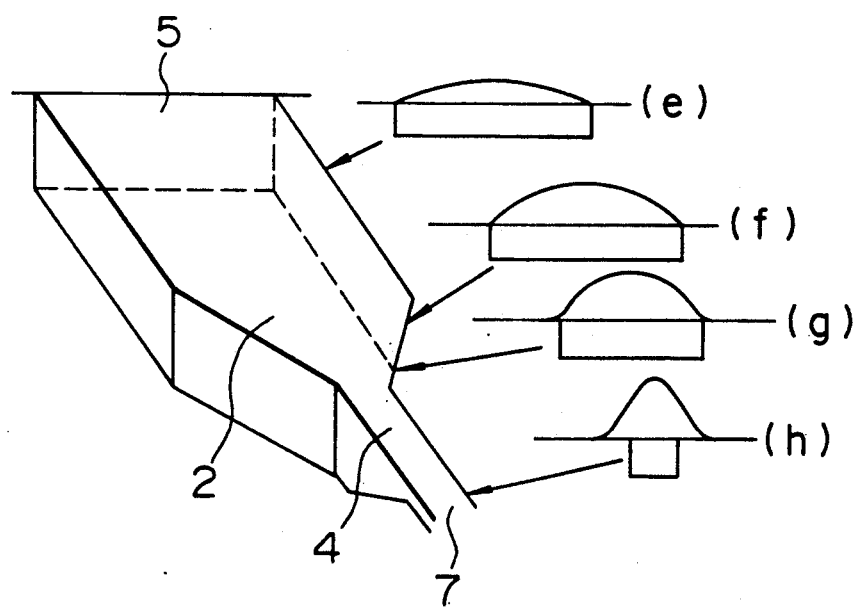
FIG. 2B is a diagram showing guided modes and changes in refractive index of the tapered wave guide of the present invention.

FIG. 2A is a perspective view of a conventional wave guide having a tapered section 2a changed in both depthwise and widthwise directions, and FIG. 2B is a perspective view of the wave guide in accordance with this embodiment in which the tapered portion is separated into a section 2 tapered in the widthwise direction and a section 4 tapered in the depthwise direction.

Referring to FIG. 2A, a loss is caused at the tapered section 2a by a change in refractive index due to optical damage. That is, the wave guide width of the tapered section 2a is increased relative to a wave guide 7a so that this section is formed as a multimode wave guide, and so that the mode of light guided is shifted from a fundamental mode to a multimode by a change in refractive index caused by optical damage. Since the wave guide section 7a has a wave guide width such as to constitute a single-mode wave guide which propagates light in the fundamental mode alone, a mode mismatch occurs between the multimode occurring at the tapered section 2a and the single-mode wave guide, thereby causing a loss. This phenomenon will be described below with respect to wave guide modes.

In (a) of FIG. 2A, a fundamental mode of light excited at an input section 5a is shown. In the tapered section 2a, both width and depth of the wave guide are reduced, so that the light power density is increased. If optical damage is thereby caused, the refractive index distribution changes as indicated in (b) and the wave guide mode is shifted from the fundamental mode to a multimode.

Thereafter, in the state shown in (c) of FIG. 2A, the extent of shifting to the multimode is increased. However, the wave guide section 7a constitutes a singlemode wave guide which propagates light in a fundamental mode alone as shown in (d), and a mismatch therefore occurs between the conditions (c) and (d), thereby causing a large loss of coupling between these wave guide sections.

To prevent such a coupling loss, it is necessary to limit the concentration of power density at the tapered section 3a and to prevent to optical damage. According to the present invention, a widthwise taper and a depthwise taper are provided separately, and the depthwise taper is set in the wave guide, so that the cross-sectional area of the widthwise tapered section is increased and the light power density in the widthwise tapered section is reduced. It is thereby possible to prevent optical damage. This effect will be described below with reference to FIG. 2B.

With respect to the wave guide mode started from the fundamental mode as shown in (e) of FIG. 2B, the increase in light power density is limited and no optical damage is caused, because the widthwise tapered section 2 is narrowed in the widthwise direction alone and has a larger sectional area in comparison with the conventional arrangement. The light therefore propagates in the fundamental mode, as shown in (f) and (g).

At the end of the widthwise taper, no multimode occurs even if optical damage is caused, since the wave guide has a single mode in the widthwise direction. It is possible to connect the widthwise tapered section to the wave guide 7 through the depthwise tapered section 4 to form a tapered wave guide having a small loss.

A method of manufacturing the thus-constructed tapered incident light wave guide in accordance with the first embodiment will be described below. A tapered wave guide in accordance with the present invention was manufactured by utilizing a method disclosed by the inventors of the present invention in Japanese Patent Unexamined Publication No. 2-236505. The manufacture process will be described below with reference to FIGS. 3A to 3D.

Figure 3A:
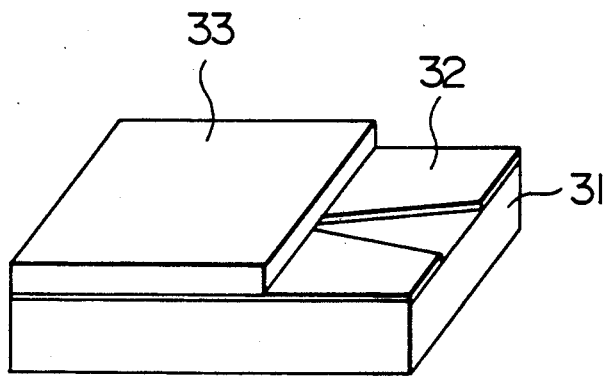
FIGS. 3A to 3D are sectional perspective views for explaining steps of manufacturing the tapered wave guide in accordance with the first embodiment of the present invention.

In the step shown in FIG. 3A, a protective $Ta_2O_5$ mask 32 for forming a coupling section was formed on a +Z plate $LiNbO_3$ substrate 31 by electron beam deposition to have a thickness of 300 ↑. Next, a photoresist pattern having a thickness of 0.5 μm was formed on the protective mask 32 by ordinary photolithography, the protective $Ta_2O_5$ mask 32 was thereafter etched by $CF_4$, and then the photoresist was removed. Next, an $LiNbO_3$ mask substrate 33 having a thickness of 1 mm and having two end surfaces processed by optical polishing was provided as a second protective mask and was pressed on the $LINbO_3$ mask and fixed by a jig.

Figure 3B:
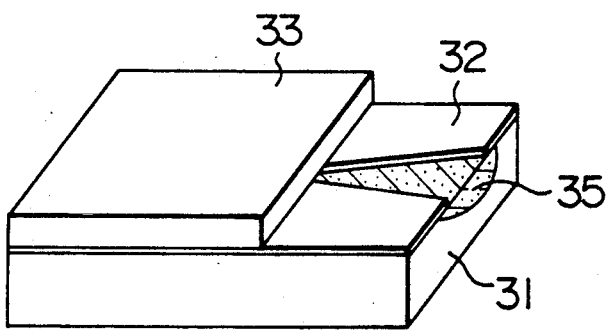

In the step shown in FIG. 3B, proton exchange was effected in pyrophosphoric acid at 230° C. for 270 minutes to form a coupling section 35 having a refractive index of 2.3 and a depth of 1.5 μm. In this step, while the wave guide depth at the coupling section 35 is set to a certain value (1.5 μm in this case) determined by the time for proton exchange in pyrophosphoric acid, tapering in the direction of depth is also effected at a position immediately below the mask substrate 33, since pyrophosphoric acid also penetrates into a portion covered with the mask substrate 33.

Figure 3C:
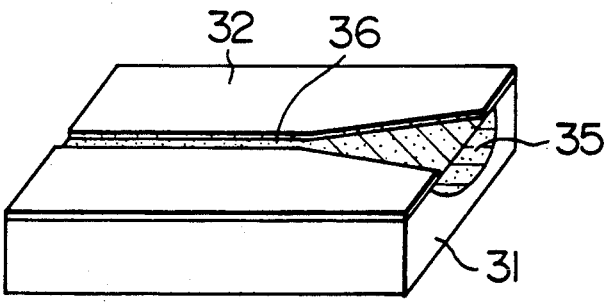

In the step shown in FIG. 3C, after the mask substrate 33 had been removed, the substrate 31 underwent proton exchange in pyrophosphoric acid at 230° C. for 5 minutes to form a high-refractivity wave guide 36 having a refractive index of 2.3 and a depth of 0.4 μm. In this step, since a wave guide having a certain depth (equal to or smaller than 1.5 μm) is formed at the connection between the coupling section 35 and the wave guide 36 in the step shown in FIG. 3B, the wave guide 36 is smoothly tapered in the depthwise direction when formed by proton exchange.

Figure 3D:
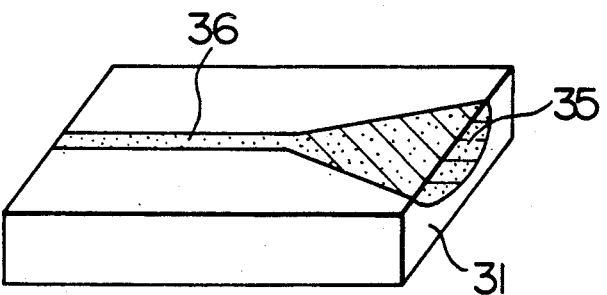

In the step shown in FIG. 3D, the Ta mask 32 was removed and the surface perpendicular to the wave guide is finished by optical polishing.

This method enables the wave guide to be easily designed by adopting the process of forming with a mask the coupling section tapered widthwise of the wave guide. Also, the manufacturing tolerance and the yield are increased because widthwise tapering and depthwise tapering are performed separately. That is, the manufacturing tolerance was increased and the manufacturing yield was increased by 10 to 50% in comparison with the conventional manufacturing method based on partial proton exchange.

The propagation loss of the wave guide manufactured was measured by exciting semiconductor laser light having a wavelength of 0.8 μm in the tapered incident light wave guide 2. To effect this measurement, light from a semiconductor laser was condensed by a focusing optical system including a collimator lens having a numerical aperture (NA) of 0.3, a ½ plate and a condenser lens having a numerical aperture of 0.6 so that a minimum focusing spot diameter of 5×1 μm was converged on the tapered wave guide. A fluorescent material was applied on the wave guide, and scattered light from the surface of the wave guide was observed with a streak camera to measure the propagation mode of the wave guide and the propagation loss of the same from the intensity of scattered light from the wave guide.

As a result, no coupling loss due to optical damage was observed with respect to the tapered incident light wave guide manufactured by the method of the invention even when the power of guided light was 30 mW, while in the conventional tapered incident light wave guide a coupling loss occurred at the tapered coupling section due to optical damage when the power of guided light was 10 mW or greater.

Figure 4:
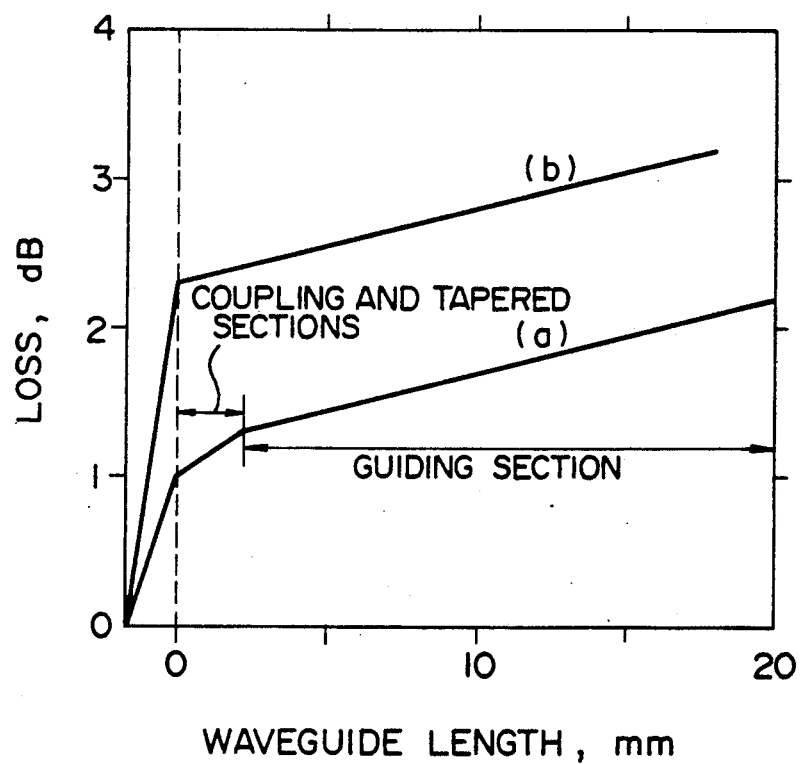
FIG. 4 is a diagram showing the results of measurement of coupling losses in the tapered wave guide in accordance with the first embodiment of the present invention.

FIG. 4 shows the results of the measurement of the coupling loss of the tapered incident light wave guide, the abscissa corresponding to a direction of a wave guide propagation component, the ordinate representing the loss. The line (a) in FIG. 4 relates to the tapered wave guide, and the line (b) relates to the linear wave guide.

With respect to the linear wave guide, there are a loss of 2.3 dB of coupling with the light source and a guided loss of 0.9 dB, and the total loss is 3.2 dB. With respect to the tapered wave guide, there are a coupling loss of 1.0 dB, a loss of 0.3 dB at the tapered section and a guided loss of 0.9 dB, and the total loss is 2.2 dB. Thus, by the tapered wave guide, the loss of the wave guide was reduced from 3.2 to 2.2 dB by 1 dB.

Thus, in accordance with this embodiment, a tapered wave guide can be constructed which can be easily designed and manufactured with respect to the coupling, which has improved in coupling efficiency and which is free from the problem of optical damage.

In this embodiment, $LiNbO_3$ is used as the substrate material. However, the substrate may be formed of any other material, e.g., a ferroelectric material such as $LiNbO_3$ doped with MgO, $LiTaO_3$, $KNbO_3$ or KTP, a dielectric such as $SiO_2$, an organic material such as MNA, or a chemical compound semiconductor such as ZnS, as long as a wave guide can be formed on the substrate.

Embodiment 2

Figure 5:
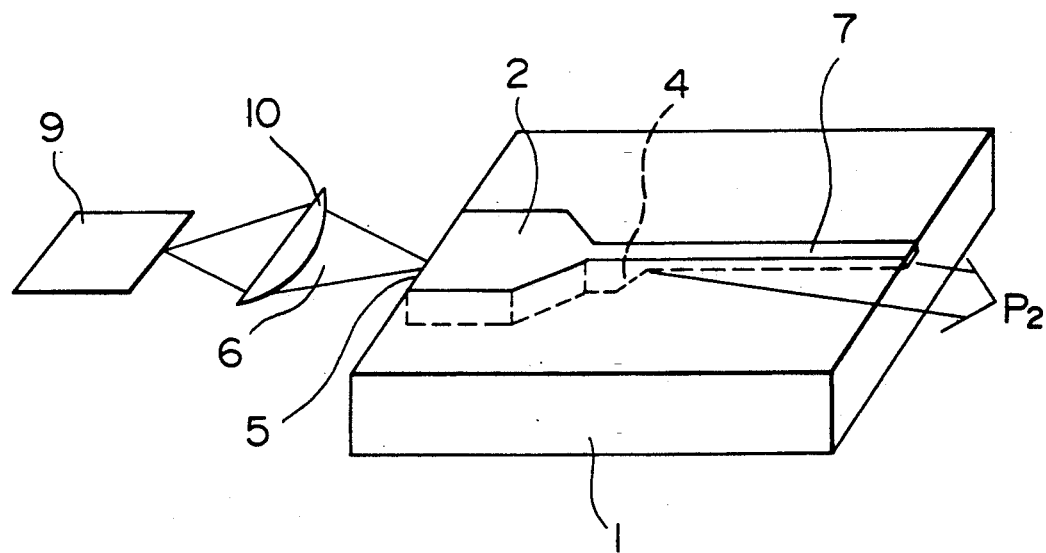
FIG. 5 is a schematic perspective view illustrating a wavelength converting element in accordance with a second embodiment of the present invention.

A second embodiment of the present invention will be described below with reference to FIG. 5. This embodiment is a light wavelength converting element in which the wave guide described as the first embodiment is formed in a non-linear optical crystal.

In the construction of the wavelength converting element of the second embodiment, the components identical to those described with respect to the first embodiment are indicated by the same reference numerals. The wavelength converting element shown in FIG. 5 has a substrate 1 formed of $LiNbO_3$ as a +Z plate (the + side of the substrate cut perpendicularly to the Z axis) having a refractive index of 2.1, a widthwise tapered section 2 formed by proton exchange in phosphoric acid, having a refractive index of 2.3 and a depth of 1.5 μm and tapered widthwise, a wave guide 7 formed by proton exchange in pyrophosphoric acid and having a depth of 0.4 μm, a depthwise tapered section 4 formed by proton exchange in pyrophosphoric acid and tapered so that its depth is changed from 1.5 to 0.4 μm, an input section 5 formed at an end surface by optical polishing, a semiconductor laser 9, and a focusing optical system 10 for introducing light from the semiconductor laser 9 to the input section 5.

The operation of the thus-constructed wavelength converting element of the second embodiment will be described below.

A wave length converting element having an input section 5, a widthwise tapered section 2, a depthwise tapered section 4 and a wave guide 7 formed by proton exchange on the non-linear optical crystal LiNbO$_3$ substrate 1 was formed by the method described with respect to the first embodiment. Light having a wavelength of 0.8 μm and a luminance area of 5×1 μm was introduced from the semiconductor laser 9 into the input section 5. The efficiency of coupling between the semiconductor laser 9 and the wave guide 7 measured was 50%. This value is 1.6 times greater than a coupling efficiency of 30% through the tapered wave guide and the focusing optical system of the semiconductor laser of the conventional arrangement. Also, based on the non-linear optical effect, a second harmonic wave P2 having a wavelength of 0.4 μm was generated orthogonally to the proton-exchanged wave guide by Cherenkov radiation, and a secondary harmonic component output P$_2$ of 0.2 mW could be obtained with respect to a semiconductor laser output of 40 mW. This value is twice as large as that of the conventional arrangement (secondary harmonic component output of 0.1 mW with respect to semiconductor laser output of 40 mW). Further, an LiNbO$_3$ substrate of 6×2×2 mm, a semiconductor laser having a length of 200 μm and a focusing optical system of 10×5×5 mm were integrally combined into a module, thereby forming a wavelength converting element having a small size, 20×6×6 mm. Thus, in accordance with this embodiment, a small large-outout wavelength converting element can be formed.

In this embodiment, LiNbO$_3$ is used as a non-linear optical material of the substrate. However, the substrate may be formed of any other material, e.g., a ferroelectric material such as LiNbO$_3$ doped with MgO, LiTaO$_3$, KNbO$_3$ or KTP, a dielectric such as SiO$_2$, an organic material such as MNA, or a chemical compound semiconductor such as ZnS, as long as the substrate has a large non-linear optical constant.

Embodiment 3

Figure 6:
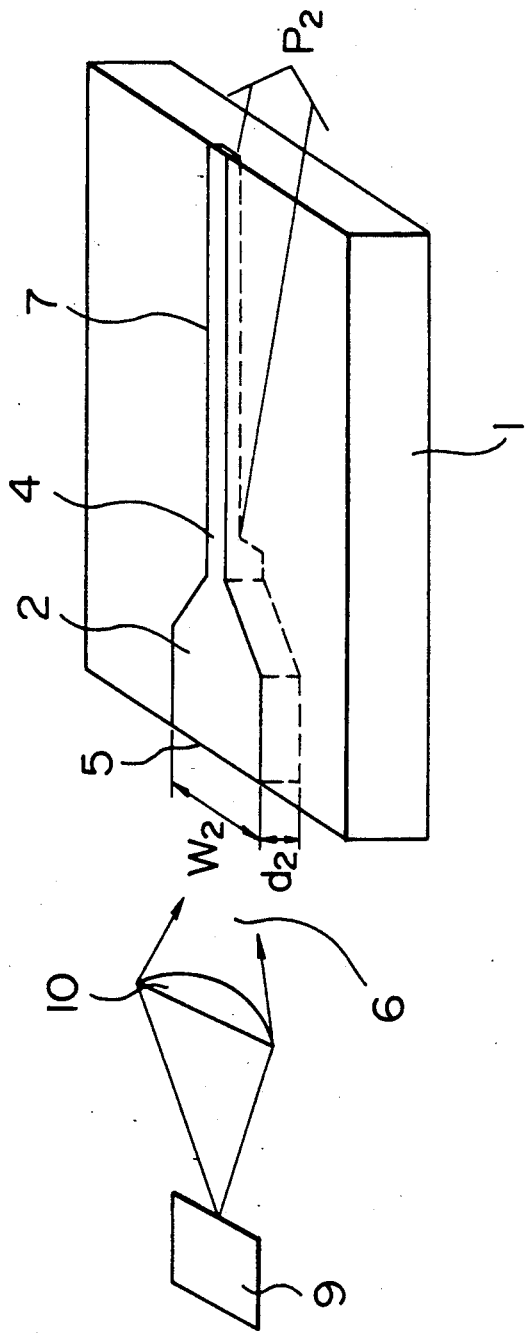
FIG. 6 is a perspective view illustrating a wavelength converting element in accordance with a third embodiment of the present invention.

FIG. 6 shows the construction of a wave length converting element in accordance with a third embodiment of the present invention. The relationship between the depth and the width of the coupling section and the power of incident light, set to d2, W2, and P1, respectively, was examined.

Figure 7:
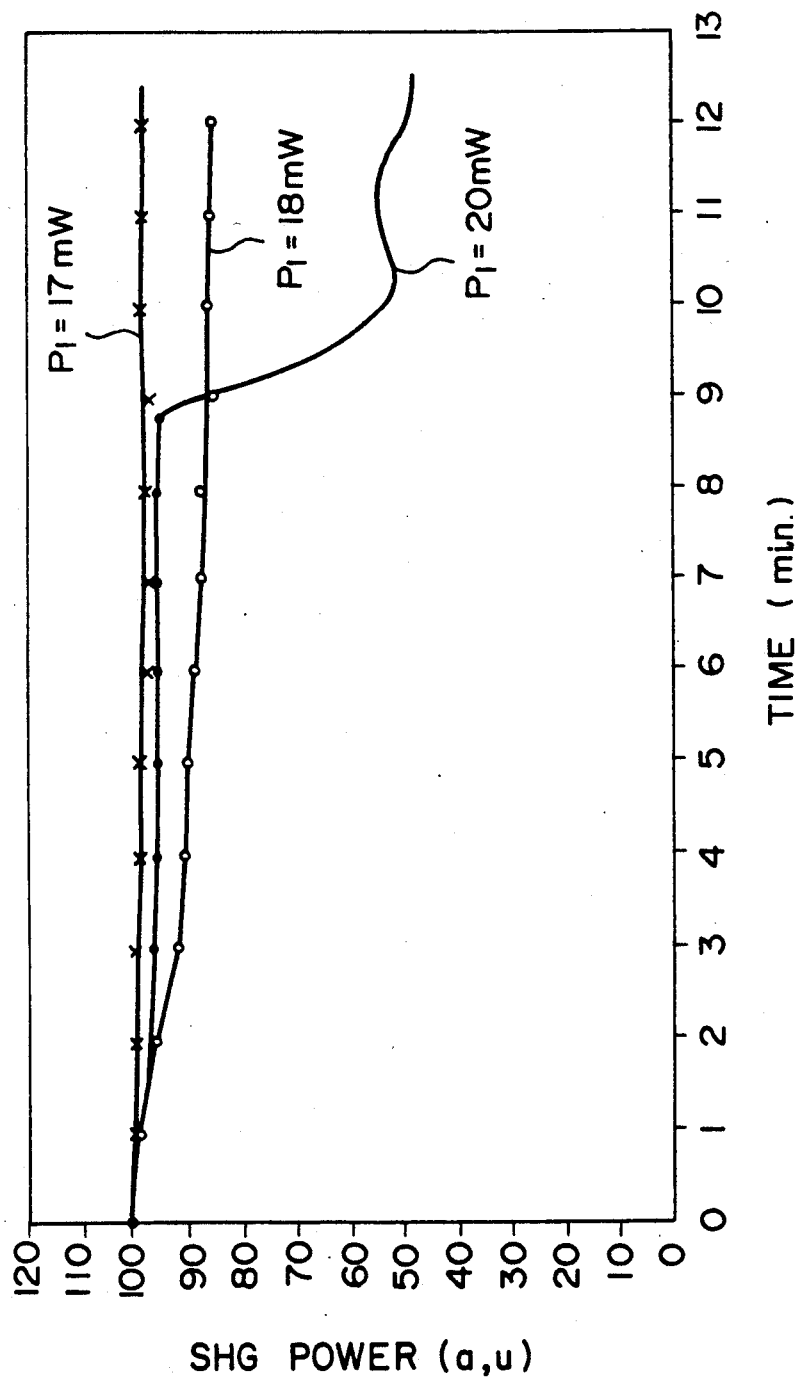
FIG. 7 is a diagram showing changes in a second harmonic generation output from the wavelength converting element of the rpesent invention.

A wave length converting element constructed in accordance with the third embodiment as shown in FIG. 6 was manufactured, and the change in the second harmonic generation (SHG) output P2 with respect to time based on the non-linear optical effect was observed by introducing light from semiconductor laser 9 into the manufactured wavelength converting element. FIG. 7 is a graph showing the results of measurements of incident light power P1 and SHG output P2 with respect to time. As can be read from this graph, no change is observed in the second harmonic SHG output P2 with time when the power of the guided light is 17 mW or less, but the SHG output P2 is changed after 5 to 10 minutes when the output is 20 mW or more.

Figure 8A:
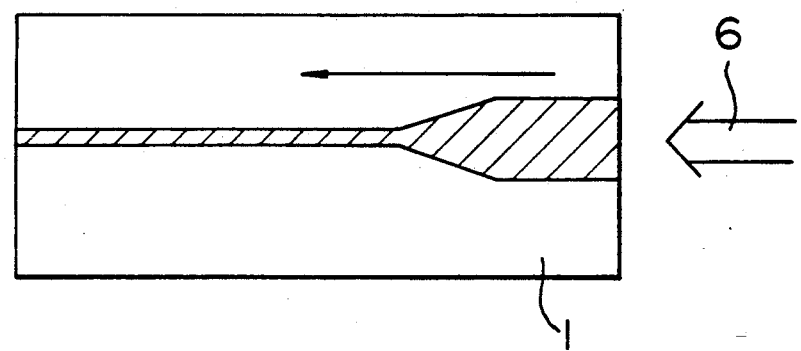
FIGS. 8A and 8B are diagrams showing states of light guided in the wavelength converting element of the present invention.
Figure 8B:
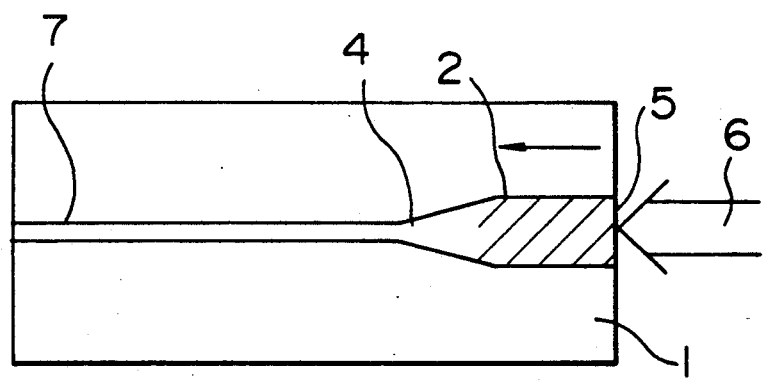

It is thought that this change is caused by a coupling loss at the tapered coupling section between the input section and the wave guide section due to optical damage to guided light in the proton-exchanged wave guide formed on the LiNbO$_3$ substrate. FIGS. 8A and 8B show the results of observation of the states of guided light with a CCD camera; FIGS. 8A and 8B show the light receiving surface of the CCD camera after 0 minute and after 10 minutes, respectively. The hatching in FIGS. 8A and 8B indicates guided light, and indicate that the loss at the tapered section is increased after 10 minutes so that the guided light does not travel beyond the tapered section. Thus, it was confirmed that the SHG output fluctuated by the occurrence of a coupling loss due to optical damage.

Next, the relationship between the shape of the tapered section and optical damage was obtained.

Figure 9:
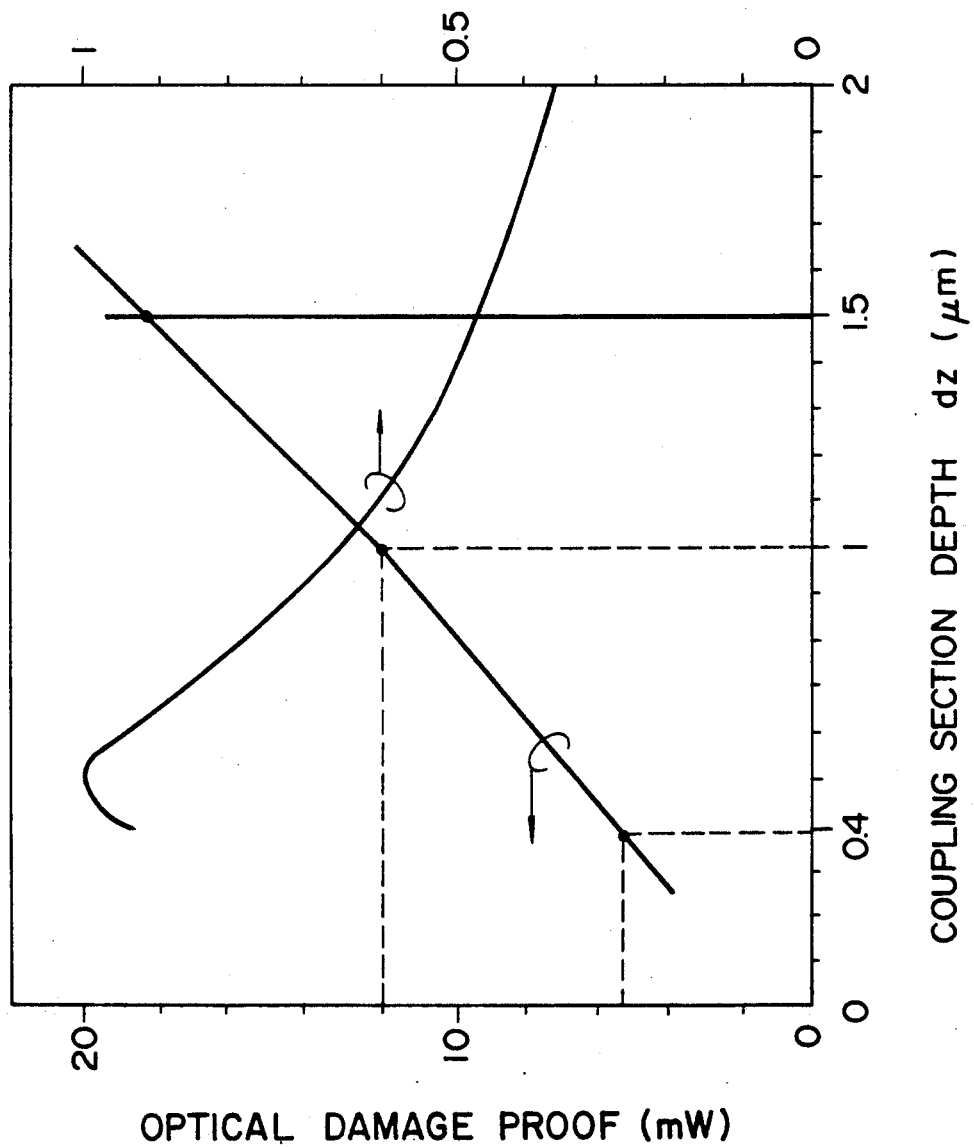
FIG. 9 is a diagram showing the relationship between the wave guide depth and damage withstanding capacity of the wavelength converting element of the present invention.
Figure 10:
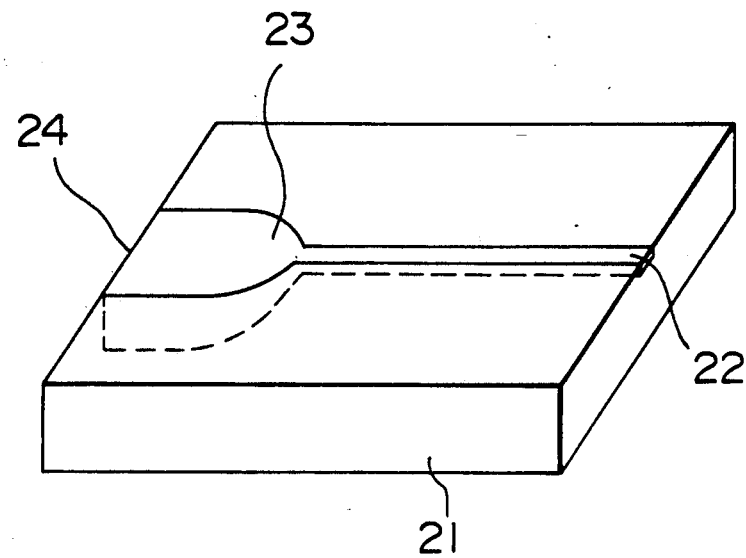
FIG. 10 is a schematic perspective view of the conventional tapered wave guide; and FIG, 11 is a schematic diagram showing a method of manufacturing the conventional tapered wave guide.
Figure 11:
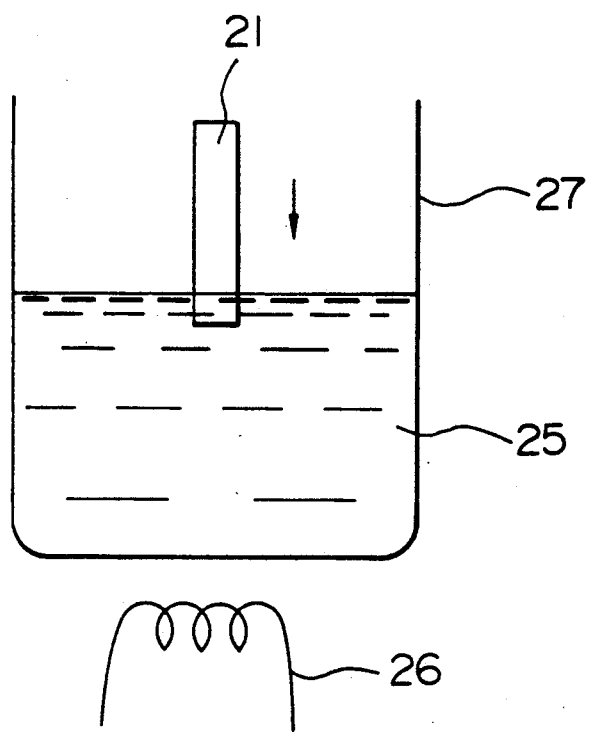

As shown in Table 1, the wave guide width W2 of the tapered section was set to 4 μm, the width W1 and the depth d1 of the wave guide section were set to 2 and 0.4 μm, respectively, while the depth d2 of the coupling was changed by being set to 0.4, 1, and 1.5 μm. The power of guided light in which optical damage was caused (which power is hereinafter referred to as Pth) was measured with respect to the depth of the coupling section. FIG. 9 shows the relationship between the wave guide depth and Pth along with the maximum of the guide light power in the wave guide. As can be read from FIG. 9, the maximum of the guided light power in the wave guide is inversely proportional to Pth and, as the wave guide size (W2×d2) is increased, pth increases so that the maximum of the guided light power is reduced. The value of Pth/(d2×W2) obtained from FIG. 9 is 300 kW/cm$^2$ irrespective of the depth of the wave guide. From this result, it is confirmed that if the size (W2×d2) of the coupling section is selected so that Pth/(W2×d2)≦300 kW/cm$^2$, it is possible to form a wave length converting element having reduced output variations due to optical damage, reduced losses, improved stability and a large output by virtue of high-efficiency coupling with the semiconductor laser. Thus, in accordance with this embodiment, the shape of the coupling section is limited to form a stable large-output wavelength converting element.

According to the present invention, as described above, a tapered incident light wave guide can be constructed which has reduced propagation losses, improved coupling efficiency and which is free from the problem of optical damage. This wave guide can be used very advantageously in practice.

In the wavelength converting element in accordance with the present invention, light from a semiconductor laser and a single-mode wave guide can be coupled at a high efficiency. It is thereby possible to increase the power density of light propagated through the wave guide and, hence, to greatly improve the wavelength conversion efficiency based on the non-linear optical effect.

Moreover, it is possible to limit the increase in coupling loss due to optical damage caused in the coupling section by designing the wavelength converting element so that the relationship between the depth d2 and the width W2 of the coupling section with respect the guided light power P is P/(d2×W2)≦300 kW/cm$^2$. Consequently, a stable large-output wavelength converting element can be formed and can be used very advantageously in practice.

TABLE 1

| $W_2$ (μm) | $W_1$ (μm) | $d_1$ (μm) | $d_2$ (μm) | Pth (mW) | Pth $d_2*W_2$ (kw/cm$^2$) |
| --- | --- | --- | --- | --- | --- |
| 4 | 2 | 0.4 | 0.4 | 4.8 | 300 |
| 4 | 2 | 0.4 | 1 | 12 | 300 |
| 4 | 2 | 0.4 | 1.5 | 18 | 300 |

What is claimed is:

1. A tapered light wave guide comprising:
    a substrate having a first end face and a second end face opposite to one another and a first side surface and a second side surface opposite to one another and intersecting said first end face and said second end face;
    a wave guide formed on one of said first side surface and said second side surface, extending in a propagation direction of light through said wave guide and having a uniform width W1 and a uniform depth d1 in said propagation direction;
    a coupling section formed on said one of said first side surface and said second side surface, extending from one of said first end face and said second end face in said propagation direction, being tapered widthwise of the substrate from a width W2 (W2>W1) to said width W1 and having a uniform depth d2 (d2>d1); and
    a depthwise tapered section formed on said one of said first side surface and said second side surface to connect said coupling section and said wave guide with each other, said depthwise tapered section having a depth which gradually changes from d2 to d1 by tapering.

2. A tapered light wave guide according to claim 1, wherein LiNbO$_3$ or LiTaO$_3$ is used as a material of said substrate.

3. A tapered light wave guide according to claim 1, wherein incident light is propagated in a fundamental mode from said coupling section into said wave guide.

4. A wavelength converting element comprising:
    a non-linear optical crystal substrate;
    a proton-exchanged wave guide formed on said substrate and having a depth d1;
    a coupling section formed at an end of said proton-exchanged wave guide, tapered widthwise of said substrate and having a depth d2 (d2>d1); and
    a depthwise tapered section formed in said wave guide at the position where said coupling section and said wave guide are connected, the depth of said depthwise tapered section being changed from d2 to d1 by tapering.

5. A wavelength converting element according to claim 4, wherein if the width of said coupling section is W2, the relationship between the depth d and the width W2 of said coupling section with respect the guided light power P is P/(d2×W2)≦300 kW/cm$^2$.

6. A wavelength converting element according to claim 4, wherein an LiNbO$_3$ or LiTaO$_3$ substrate is used as said non-linear optical crystal substrate.

7. A wavelength converting element according to claim 4, wherein incident light is propagated in a fundamental mode from said coupling section into said wave guide, and second harmonic generation light is emitted by Cherenkov radiation.

* * * * *